United States Patent

[11] 3,602,608

[72] Inventor John G. Morley
 Little Eaton, England
[21] Appl. No. 845,395
[22] Filed July 28, 1969
[45] Patented Aug. 31, 1971
[73] Assignee Rolls Royce Limited
 Derby, England
[32] Priority Aug. 1, 1968
[33] Great Britain
[31] 36874/68

[54] COMPOSITE BLADE
 8 Claims, 6 Drawing Figs.
[52] U.S. Cl. .................................................. 416/224,
 416/226, 416/230
[51] Int. Cl. .................................................. F01d 5/14
[50] Field of Search ...................................... 170/159;
 253/77 M, 77 MP, 77 MC; 416/224, 226, 229, 230

[56] References Cited
UNITED STATES PATENTS

| | | | |
|---|---|---|---|
| 1,567,574 | 12/1925 | Clay | 416/230 |
| 2,022,562 | 11/1935 | Grumpelt | 416/230 (X) |
| 2,950,083 | 8/1960 | Compton et al. | 416/230 |
| 3,294,366 | 12/1966 | Coplin | 416/229 |
| 3,327,995 | 6/1967 | Blackhurst et al. | 416/224 |
| 3,368,795 | 2/1968 | Bolin et al. | 416/229 |

Primary Examiner—Everette A. Powell, Jr.
Attorney—Cushman, Darby & Cushman

ABSTRACT: A blade such as a compressor or turbine blade for use in a gas turbine engine consists of a plurality of fiber reinforced layers, such as carbon fiber the planes of the layers being arranged at an acute angle to the chord of the blade. The fibers of adjacent layers can be inclined at an acute angle to each other and adjacent the leading edge of the blade some of the fibers of the adjacent layers can be perpendicular to one another. The blade can have a metal reinforcement in the form of an arch extending around the leading edge, tip and trailing edge of the blade.

PATENTED AUG31 1971

3,602,608

Inventor
JOHN G. MORLEY

By Cushman, Darby & Cushman
Attorneys

COMPOSITE BLADE

This invention relates to a blade for use in an elastic fluid machine for example, the blades of a compressor or turbine for a gas turbine engine.

The invention provides a blade consisting of a plurality of fiber reinforced layers bonded together, the planes of the layers being at an acute angle to the chord of the blade.

The fibers of adjacent layers may be at an acute angle to each other and this angle may increase towards the leading edge of the blade so that at least some of the fibers of adjacent layers are perpendicular to the leading edge. The leading and trailing edges may have metal reinforcement which may take the form of an arch surrounding a fiber reinforced center section. The base of the arch and the center section may each have a root fixing portion. Preferably the fibers are carbon fibers.

Figure 1:
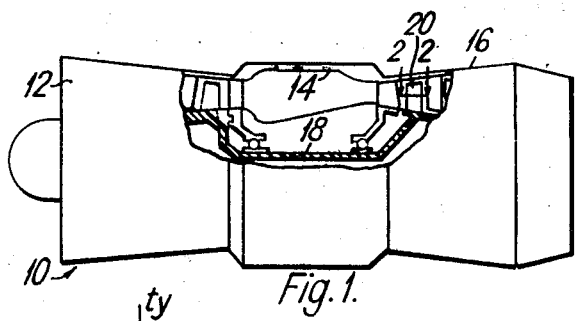
Figure 2:
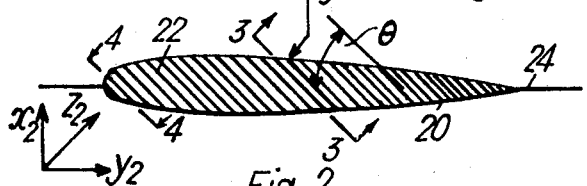
Figure 3:
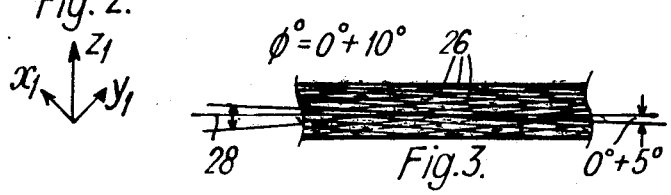
Figure 4:
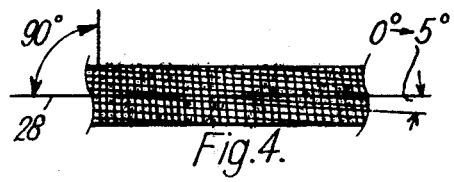
Figures 5, 6:
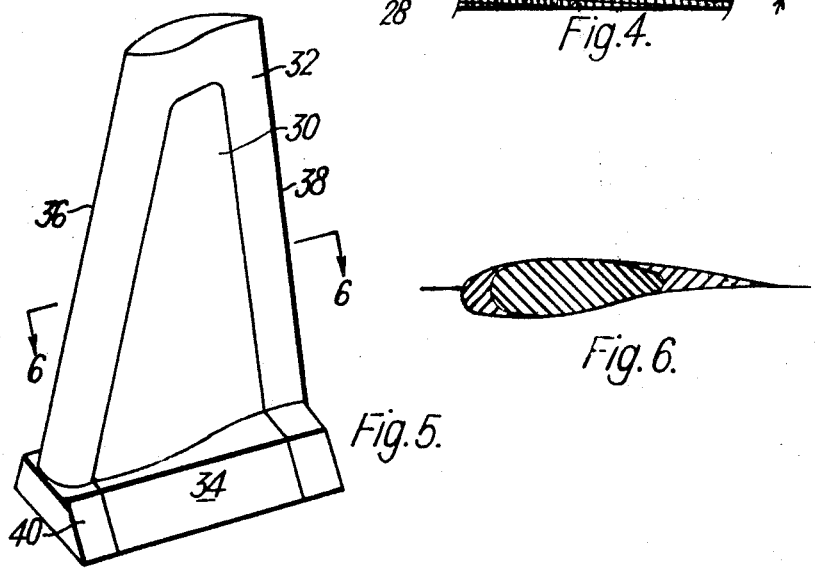

The invention will now be more particularly described with reference to the accompanying drawing in which;

FIG. 1 is a diagrammatic view of a gas turbine engine having one form of blade according to the present invention, FIG. 2 is a cross section to an enlarged scale on line 2—2 of FIG. 1, FIG. 3 is a part-cross on line 3—3 of FIG. 2, FIG. 4 is a part cross section on line 4—4 of FIG. 2, FIG. 5 is a perspective view of another embodiment of the invention, and FIG. 6 is a section on line 6—6 of FIG. 5.

A gas turbine engine 10 has in flow series, compressor means 12, combustion means 14 and turbine means 16, the compressor and turbine means being mounted on a common shaft 18. The turbine means has a plurality of blades 20, each of which is made up of a number of carbon fiber reinforced resin layers 22 bonded together and formed into a blade shape by not pressing in a mould. The layers 22 are parallel to each other and are inclined at an acute angle $\theta°$ to the chord 24 of the blade. The fibers 26 in each layer extend approximately along the length of the blade from root to tip and the fibers of adjacent layers make an angle $\Phi$ of up to 10° with each other, the individual fibers making an angle of up to 5° about a mean line 28 extending from the root to the tip of the blade. Towards the leading edge of the blade the angle $\Phi$ increases so that near the leading edge some of the layers and therefore some of the fibers are at right angles to the mean line 28. The blades 20 are specifically designed to resist impact forces and considering a force $Z_1$ applied to the blade; $Z_1$ can be resolved into components $x_1$ and $y_1$ respectively parallel to and at right angles to the layers 22. The material is much stronger in flexure for a range of angles of $\theta$, so considering failure brought about by component $y_1$; as $\theta$ increases, the component $y_1$ decreases and the effective thickness $ty$ of the blade increases. Thus the flexural strength increases rapidly as $\theta$ increases.

Since the adjacent layers are cross braced with respect to each other but perpendicular to the plane of shear the flexure strength is increased and the mode of failure is likely to be separation of the layers perpendicular to the plane of shear. Since fibers are crossing the plane of shear, the easiest failure mode is now due to buckling and layer separation in the plane of the cross bracing layers. It is likely that there will be some value of $\Phi$ at which shear failure and buckling take place at the same flexure stress which should be greater than 10,000 p.s.i.

The optimum arrangement of fibers to give maximum resistance to shear failure in the plane of the blade coupled with appropriate torsional properties is arrived at by adjustments to the angle of cross bracing between adjacent layers ($\Phi$) and the angle ($\theta$) between the layers and the blade chord 24.

In the case of an impact force $Z_2$ applied to the leading edge of the blade, a bending component $x_2$ at right angles to the chord is applied to the blade and the fibers at right angles to the mean line resist this bending. These fibers do not contribute to the longitudinal strength of the blade but they do tend to make the leading edge of the blade more resistant to impact damage. One way in which damage to the leading edge can be minimized is shown in FIGS. 5 and 6.

The blade shown in these figures comprises a center portion 30 and a reinforcement arch 32. The portion 30 is constructed in a similar manner to the blade 20 except that the angle $\Phi$ remains constant and does not increase towards the leading edge of the blade. The portion 30 is provided with a root fixing base 34. The arch 32 is made of a hard impact resistant metal and has leading and trailing edges 36, 38 respectively and root fixing portions 40 which match the base 34. The center portion 30 and the arch 32 are secured together either by a mechanical key or a chemical bond.

I claim:

1. A blade for use in an elastic fluid flow machine comprising a plurality of fiber reinforced layers bonded together in parallel relationship to each other to form the blade, said layers lying in planes extending at a predetermined acute angle theta ($\theta$) to a chord of the blade and each of the layers having the fibers therein extending approximately along the length of the blade from the root to the tip with fibers of adjacent layers making a predetermined acute angle phi ($\Phi$) with each other.

2. A blade as claimed in claim 1 in which the angle phi ($\Phi$) between fibers of the adjacent layers increases towards the leading edge of the blade.

3. A blade as claimed in claim 1 in which some of the fibers of adjacent layers increases towards the leading edge of the blade.

4. A blade as claimed in claim 1 in which the fibers of adjacent layers make an acute angle phi ($\Phi$) with each other up to 10°.

5. A blade as claimed in claim 1 in which individual fibers within the layers make an acute angle up to 5° with a mean line extending from the root to the tip of the blade.

6. A blade as claimed in claim 1 in which the fibers of adjacent layers make an acute angle phi ($\Phi$) with each other up to 10° and in which individual fibers within the layers make an acute angle up to 5° with a mean line extending from the root to the tip of the blade.

7. A blade as claimed in claim 6 in which the fibers are carbon.

8. A blade as claimed in claim 1 including a metal reinforcement in a form of an arch extending along the leading edge, around the tip, and along the trailing edge of the blade.